(12) United States Patent
Srivastava et al.

(10) Patent No.: US 10,942,880 B2
(45) Date of Patent: Mar. 9, 2021

(54) AGING TOLERANT SYSTEM DESIGN USING SILICON RESOURCE UTILIZATION

(71) Applicant: Intel Corporation, Santa Clara, CA (US)

(72) Inventors: Amit Kumar Srivastava, Folsom, CA (US); Asad Azam, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/236,471

(22) Filed: Dec. 29, 2018

(65) Prior Publication Data

US 2019/0138479 A1 May 9, 2019

(51) Int. Cl.
*G06F 13/40* (2006.01)
*G06F 13/16* (2006.01)

(52) U.S. Cl.
CPC ...... *G06F 13/4022* (2013.01); *G06F 13/1668* (2013.01)

(58) Field of Classification Search
CPC .......................... G06F 13/4022; G06F 13/1668
See application file for complete search history.

(56) References Cited

U.S. PATENT DOCUMENTS

| | | | | |
|---|---|---|---|---|
| 6,243,391 B1* | 6/2001 | Holmquist | .......... | H04L 2/40026 370/410 |
| 2007/0294572 A1* | 12/2007 | Kalwitz | .............. | G06F 11/0727 714/5.11 |
| 2008/0028236 A1* | 1/2008 | Capps | ..................... | G06F 1/206 713/300 |
| 2008/0104264 A1* | 5/2008 | Duerk | ................... | H04L 69/324 709/230 |
| 2010/0083040 A1* | 4/2010 | Voigt | .................... | G06F 11/201 714/6.32 |
| 2011/0191637 A1* | 8/2011 | Wight | ..................... | G06F 11/00 714/43 |

(Continued)

FOREIGN PATENT DOCUMENTS

KR 20140018912 2/2014
WO WO-2020139496 A1 7/2020

OTHER PUBLICATIONS

"International Application Serial No. PCT US2019 062790, International Search Report dated Mar. 19, 2020", 3 pgs.

(Continued)

*Primary Examiner* — Tim T Vo
*Assistant Examiner* — Harry Z Wang
(74) *Attorney, Agent, or Firm* — Schwegman Lundberg & Woessner, P.A.

(57) ABSTRACT

An integrated circuit for monitoring components of the integrated circuit, comprising: a resource monitoring circuit configured to: track activity factors for a plurality of components of the integrated circuit; evaluate the activity factors for each of the plurality of components; determine whether an activity factor for a particular component of the plurality of components exceeds a threshold; and transmit, from the resource monitoring circuit, a signal to a software element, causing the software element to deactivate the particular component and activate an alternate component, when the activity factor for the particular component exceeds the threshold and the alternate component is available to substitute for the particular component.

25 Claims, 4 Drawing Sheets

(56) References Cited

U.S. PATENT DOCUMENTS

| | | | |
|---|---|---|---|
| 2012/0047325 A1* | 2/2012 | Sakuma | G06F 11/0727 |
| | | | 711/114 |
| 2012/0324146 A1* | 12/2012 | Marks | G06F 13/385 |
| | | | 711/103 |
| 2013/0117767 A1* | 5/2013 | Myrah | G06F 13/102 |
| | | | 719/326 |
| 2015/0350322 A1* | 12/2015 | Akaike | G06F 3/0629 |
| | | | 707/827 |

OTHER PUBLICATIONS

"International Application Serial No. PCT US2019 062790, Written Opinion dated Mar. 19, 2020", 7 pgs.

\* cited by examiner

AGING TOLERANT SYSTEM DESIGN USING SILICON RESOURCE UTILIZATION

TECHNICAL FIELD

Embodiments described herein generally relate to silicon device management, and in particular, to an aging tolerant system design using silicon resource utilization.

BACKGROUND

As semiconductor manufacturing processes advance, the lower process geometry may result in higher failure rates due to aging effects such as hot carrier effect, negative or positive-bias temperature instabilities (NBTI/PBTI), or dielectric breakdowns. Most of these failures are indirectly related to how frequently the internal component is used. Certain applications, such as industrial applications or automotive applications, target their product life-cycle to be on the order often years or more based on functional safety standards. Various significant efforts like improving silicon process, over-designing to mitigate aging, and digital schemes (error correction, end to end parity, etc.) have been explored to meet product life cycle requirements. Engineers spend significant amounts of time and resources to identify degradation factors and meet target product lifecycles.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

System-on-chip (SOC) design is increasing in complexity. With increasingly smaller semiconductor fabrication used in current and future fabrication processes, aging and resulting failures becomes more pronounced. Over-designed manufacturing and digital scheme design have been used in an attempt to address the aging impact, but they are not sufficient to meet intended product life cycles.

In an example, vehicles are equipped with a plethora of electronics to support engine control, transmission, safety systems, navigation, air bags, climate controls, seating, entertainment systems, and the like. An autonomous vehicle includes computer systems to control steering, braking, sensors, artificial intelligence systems, vehicle-to-vehicle communication, infrastructure-to-vehicle communication, and other systems to support partial or fully autonomous driving. Many of these electronic components are mission critical and are intended to have a long product life cycle. Additionally, autonomous driving systems must meet stringent regulatory requirements for functional safety. Standards, such as the Automotive Safety Integrity Level (ASIL), have been defined to provide the safety requirements for autonomous vehicles. This is but one example technology space that may benefit from the mechanisms described herein. Others technology applications include, but are not limited to, industrial applications, space exploration, medical diagnostics, air transportation, network installations, and the like.

Figure 1:
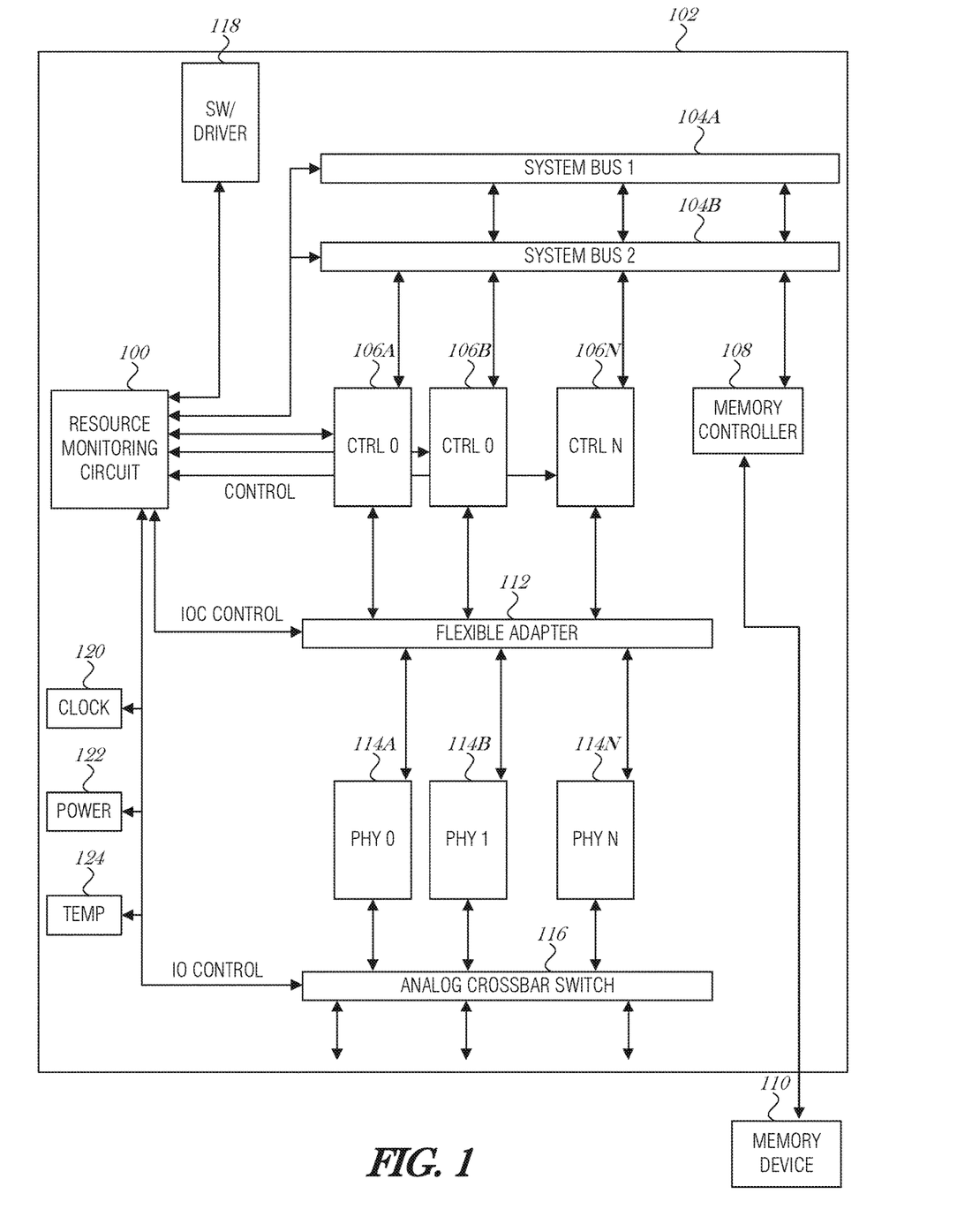
FIG. 1 is a block diagram illustrating a resource monitoring circuit, according to an embodiment.

FIG. 1 is a block diagram illustrating a resource monitoring circuit 100, according to an embodiment. The resource monitoring circuit 100 may be implemented on-die in a system-on-chip (SOC) 102, for example. The resource monitoring circuit 100 may interface with various components of the SOC 102, to manage input and output (IO). In particular, the resource monitoring circuit 100 is used to monitor resource utilization over a product's life cycle and mitigate aging effects by distributing IO assignments, such as by uniformly utilizing IO assignments. For instance, the resource monitoring circuit 100 may identify which IOs are assigned and unassigned, which are assigned to various controller lanes, and which are assigned to various physical (PHY) interface drivers. Additionally, the resource monitoring circuit 100 may monitor one or more virtual channels (e.g., VC0/VC1 IO channels) at the system fabric bus level and handle memory resource allocation over the memory IO channel (e.g., via a memory controller). Processing cores may be selectively activated based on monitoring statistics as well.

Depending on assigned resource utilization thresholds, the resource monitoring circuit 100 acts to distribute silicon resources across the product life cycle, such as by uniformly distributing the resources. Examples of resource distribution include assignment of Fabric IO Channel (VC0/VC1), IO Controller Channel assignments through Flexible Adapter logic, and PHY IOs through crossbar switches to randomize IOs activity, memory address swizzles, or other DIMM devices. The resource monitoring circuit 100 is also applicable to other silicon resources for resource distribution.

The SOC 102 includes system buses 104A-B (collectively referred to as 104). System buses 104 interconnect controllers 106A-N (collectively referred to as 106) and memory controller 108 to resource monitoring circuit 100. Memory controller 108 may be used to access memory device 110. A flexible adapter 112 is used to direct IO between controllers 106 and PHY IOs 114A-N (collectively referred to as 114). An analog crossbar switch 116 is further used to direct IO from off-chip elements to PHY IOs 114. The resource monitoring circuit 100 may monitor active/inactive states of the flexible adapter 112 and analog crossbar switch 116.

The resource monitoring circuit 100 may be configured, controlled, or programmed using system software 118, which may be implemented as firmware, system drivers, basic input output (BIOS) or unified extensible firmware interface (UEFI) resources, or the like.

Additionally, the resource monitoring circuit 100 may interface with clock unit 120 or power unit 122 to control the clock timing parameters or power parameters for chips, in order to increase or decrease the performance of chips. The resource monitoring circuit 100 may reference the temperature sensing unit 124 to throttle power or clock parameters.

The resource monitoring circuit 100 monitors various components of the SOC 102 using active or idle signals of the components. An activity factor (AF) is calculated based on the amount of activity or idleness of a component. Using the AF, the resource monitoring circuit 100 is able to track component use, memory device use, core utilization, and the like. Based on the AF for a component, the resource monitoring circuit 100 may interface with the software 118 to notify the software 118 to reassign the resource.

In a first aspect, the resource monitoring circuit 100 is configured, programmed, or adapted to monitor 10 components (e.g., fabric IO channels via flexible adapter 112, controllers 106, or PHY IOs 114) to maintain uniform usage across the IO. For instance, the resource monitoring circuit 100 may cause the flexible adapter 112 to change to a non-active controller 106, or may cause the crossbar switch 116 to randomize PHY IO 114 usage, or fabric cycles selections (e.g., through VC0/VC1, not shown).

In a second aspect, the resource monitoring circuit 100 may monitor address space usage on the memory device 110 by interfacing with the memory controller 108. The resource monitoring circuit 100 may cause a memory write to be distributed (e.g., swizzled) across several memory devices. Swizzle logic (not shown) may cause a memory access to map a physical memory address to multiple different rows within a memory device or across memory devices, such as by mapping to every-other row. Address swizzling, or uniquely mapping address bits to multiple different rows of different memory devices in a group, may reduce the effects of semiconductor fatigue.

In a third aspect, the resource monitoring circuit 100 may monitor core usage and activate non-active cores, rotating processing tasks among cores. This may be selectively used when one or more cores are idle.

In a fourth aspect, the resource monitoring circuit 100 may monitor clock and power supply sources based on activity factors. The resource monitoring circuit 100 may adaptively increase or decrease the power or clock timing to affect chip performance.

Other aspects may use unassigned FIFO channels (not shown) for flow controls, adjust off-chip silicon usage, or other monitoring or control tasks to randomize or distribute resource utilization to mitigate aging stress and reduce the chances of failure.

Figure 2:
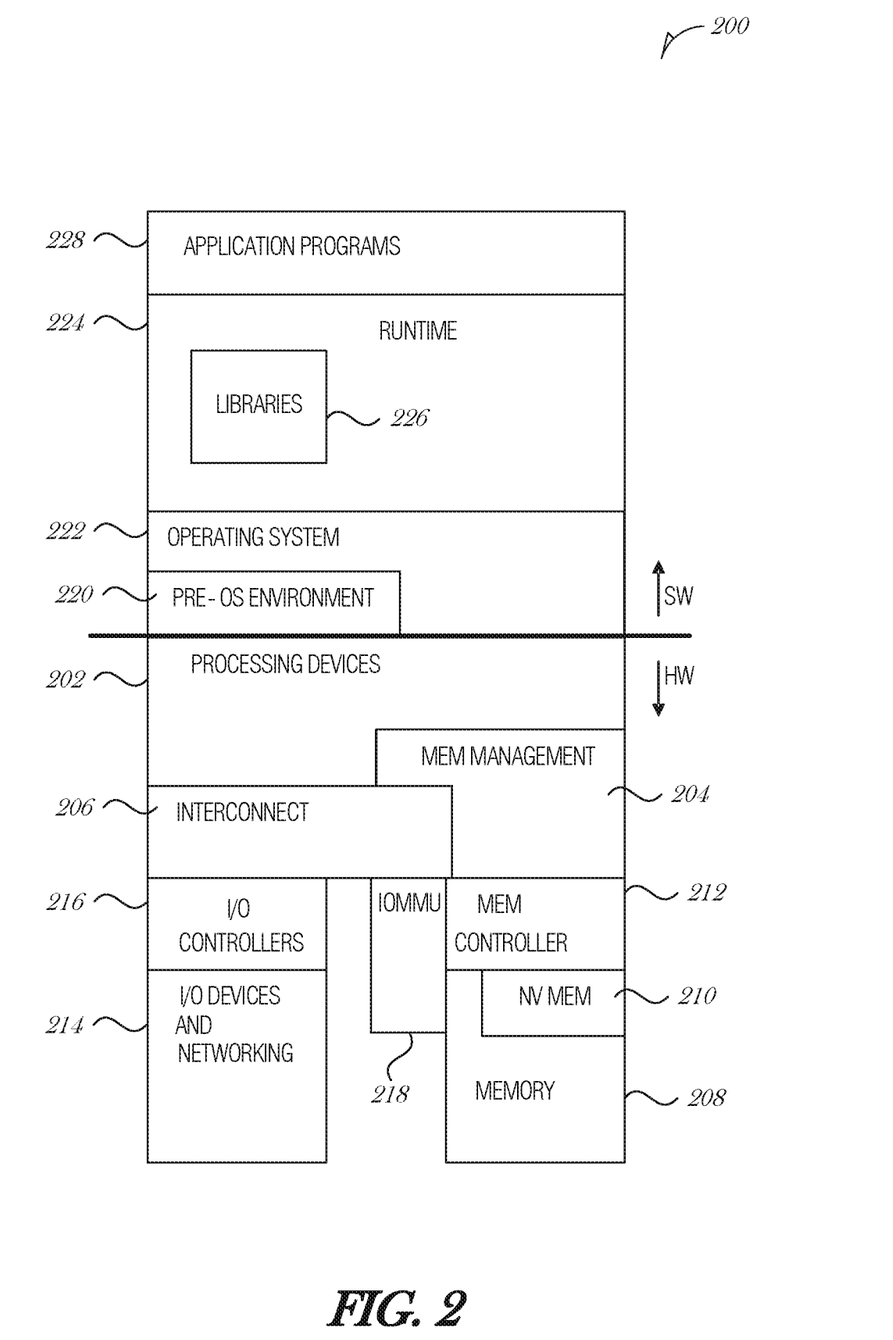
FIG. 2 is a diagram illustrating hardware and software architecture of a computerized component, in which various interfaces between hardware components and software components are shown, according to an embodiment.

FIG. 2 is a diagram illustrating hardware and software architecture 200 of a computerized component, in which various interfaces between hardware components and software components are shown, according to an embodiment. As indicated in FIG. 2 by "HW," hardware components are represented below the divider line, whereas software components (denoted by "SW") reside above the divider line. On the hardware side, processing devices 202 (which may include one or more microprocessors, digital signal processors, etc., each having one or more processor cores), are interfaced with memory management device 204 and system interconnect 206. Memory management device 204 provides mappings between virtual memory used by processes being executed, and the physical memory. Memory management device 204 may be an integral part of a central processing unit (CPU), where the CPU may also include the processing devices 202. The SOC 102 from FIG. 1 above, may be incorporated in or be represented by various components of the HW region (e.g., processing devices 202, memory management 204, I/O controllers 216, etc.).

Interconnect 206 includes a backplane such as memory, data, and control lines, as well as the interface with input/output devices, e.g., PCI, USB, etc. Memory 208 (e.g., dynamic random access memory—DRAM) and non-volatile memory 210 such as flash memory (e.g., electrically-erasable read-only memory—EEPROM, NAND Flash, NOR Flash, etc.) are interfaced with memory management device 204 and interconnect 206 via memory controller 212. This architecture 200 may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 214, which interface with interconnect 206 via corresponding I/O controllers 216.

In a related embodiment, input/output memory management unit (IOMMU) 218 supports secure direct memory access (DMA) by peripherals. IOMMU 218 may provide memory protection by mediating access to memory 208 from I/O device 214. IOMMU 218 may also provide DMA memory protection in virtualized environments, where it allows certain hardware resources to be assigned to certain guest VMs running on the system, and enforces isolation between other VMs and peripherals not assigned to them.

On the software side, a pre-operating system (pre-OS) environment 220 is executed at initial system start-up and is responsible for initiating the boot-up of the operating system. One traditional example of pre-OS environment 220 is a system basic input/output system (BIOS). In present-day systems, a unified extensible firmware interface (UEFI) may be implemented. Pre-OS environment 220 is not only responsible for initiating the launching of the operating system, but also provides an execution environment for embedded applications.

A portion of the pre-OS environment 220 is the Memory Reference Code (MRC). The MRC is responsible for initializing the memory 208. This is performed as part of a power on self test (POST) process. The MRC firmware saves memory training data to non-volatile memory 210 to improve boot times on subsequent boots. On subsequent boots, so long as no exception cases have occurred, the data from non-volatile memory 210 is re-used.

Operating system (OS) 222 provides one or more kernels that control the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 222 provides device drivers, and a variety of common services such as those that facilitate interfacing with peripherals and networking, which provide abstraction for application programs so that the applications do not need to be responsible for handling the details of such common operations. Operating system 222 additionally provides a graphical user interface (GUI) that facilitates interaction with the user via peripheral devices such as a monitor, keyboard, mouse, microphone, video camera, touchscreen, and the like.

Runtime system 224 implements portions of an execution model, including such operations as putting parameters onto the stack before a function call, the behavior of disk input/output (IO), and parallel execution-related behaviors. Runtime system 224 may also perform support services such as type checking, debugging, or code generation and optimization.

Libraries 226 include collections of program functions that provide further abstraction for application programs. These include shared libraries, dynamic linked libraries (DLLs), for example. Libraries 226 may be integral to the operating system 222, runtime system 224, or may be added-on features, or remotely-hosted. Libraries 226 define an application program interface (API) through which a variety of function calls may be made by application programs 228 to invoke the services provided by the operating system 222. Application programs 228 are those programs that perform useful tasks for users, beyond the tasks performed by lower-level system programs that coordinate the basic operability of the computing device itself.

Depending on the design of the computerized component, some aspects that are described in FIG. 2 may be omitted or combined with other aspects.

The systems described in FIGS. 1-2 improve on the operation of the computerized component by reducing and mitigating semiconductor fatigue. Such mechanisms increase the operational lifetime of any silicon-based component and improves the functional safety of such components.

Figure 3:
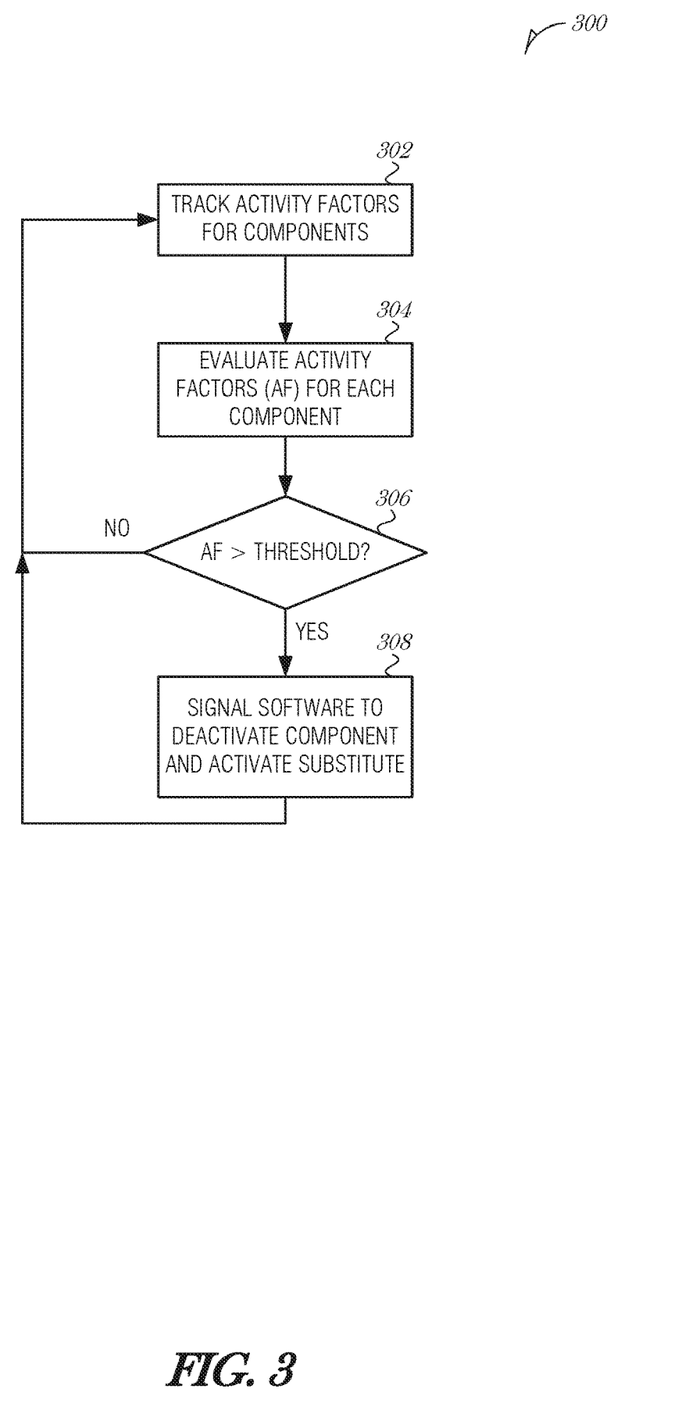
FIG. 3 is a flow diagram illustrating a method for monitoring components of an integrated circuit, according to an embodiment.

FIG. 3 is a flow diagram illustrating a method 300 for monitoring components of an integrated circuit, according to an embodiment. At 302, activity factors for a plurality of components of the integrated circuit are tracked by a resource monitoring circuit.

At 304, activity factors for each of the plurality of components are evaluated. A resource monitoring circuit, such as resource monitoring circuit 100 shown in FIG. 1, may be used to track and evaluate the activity factors for each of the plurality of components.

At 306, it is determined whether an activity factor for a particular component of the plurality of components exceeds a threshold. The threshold may be static or dynamic. A static threshold may be based on the particular component, the desired lifespan of the component, or other factors. A dynamic threshold may be based on an analysis of one or more previous activity factor values. For example, when multiple components are in use or when there is a limited number of alternate components, a dynamic threshold may be increased.

In an embodiment, the activity factor is a ratio of active versus inactive time over a measurement period. In a related embodiment, the activity factor is an aggregate amount of use. In an embodiment, the threshold is specific for the particular component.

At 308, when the activity factor for the particular component exceeds the threshold and an alternate component is available to substitute for the particular component, then the resource monitoring circuit transmits a signal to a software element, causing the software element to deactivate the particular component and activate the alternate component. The resource monitoring circuit may be used to determine whether the activity factor for the particular component exceeds the threshold. A resource monitoring circuit may also determine the availability of alternate components, and interact with a software element to deactivate the particular component and activate the alternate component.

In an embodiment, the particular component comprises an input/output controller. In a related embodiment, the particular component comprises a memory controller. In a further embodiment, to deactivate the particular component and activate the alternative component, the software element is configured to cause the memory controller to swizzle memory accesses to a memory device.

In an embodiment, the particular component comprises a flexible adapter. In a further embodiment, to deactivate the particular component and activate the alternative component, the software element is configured to cause the flexible adapter to change to a non-active controller.

In an embodiment, the particular component comprises an analog crossbar switch to randomize IOs. In a further embodiment, to deactivate the particular component and activate the alternative component, the software element is configured to cause the analog crossbar switch to randomize physical interface driver usage.

In an embodiment, the particular component comprises a processor core. In a further embodiment, to deactivate the particular component and activate the alternative component, the software element is configured to deactivate the processor core and activate an idle processor core.

In an embodiment, the software element comprises firmware. In an embodiment, the software element comprises a device driver.

In an embodiment, the method 300 includes determining, by the resource monitoring circuit, when the alternate component is available to substitute for the particular component.

At 310, the evaluation continues for the remainder of the plurality of components. When the evaluation is complete, processing continues to block 302. The resource monitoring circuit may continue to track activity factors, alternate resource availability, and other metrics for subsequent analysis and resource redistribution.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 4:
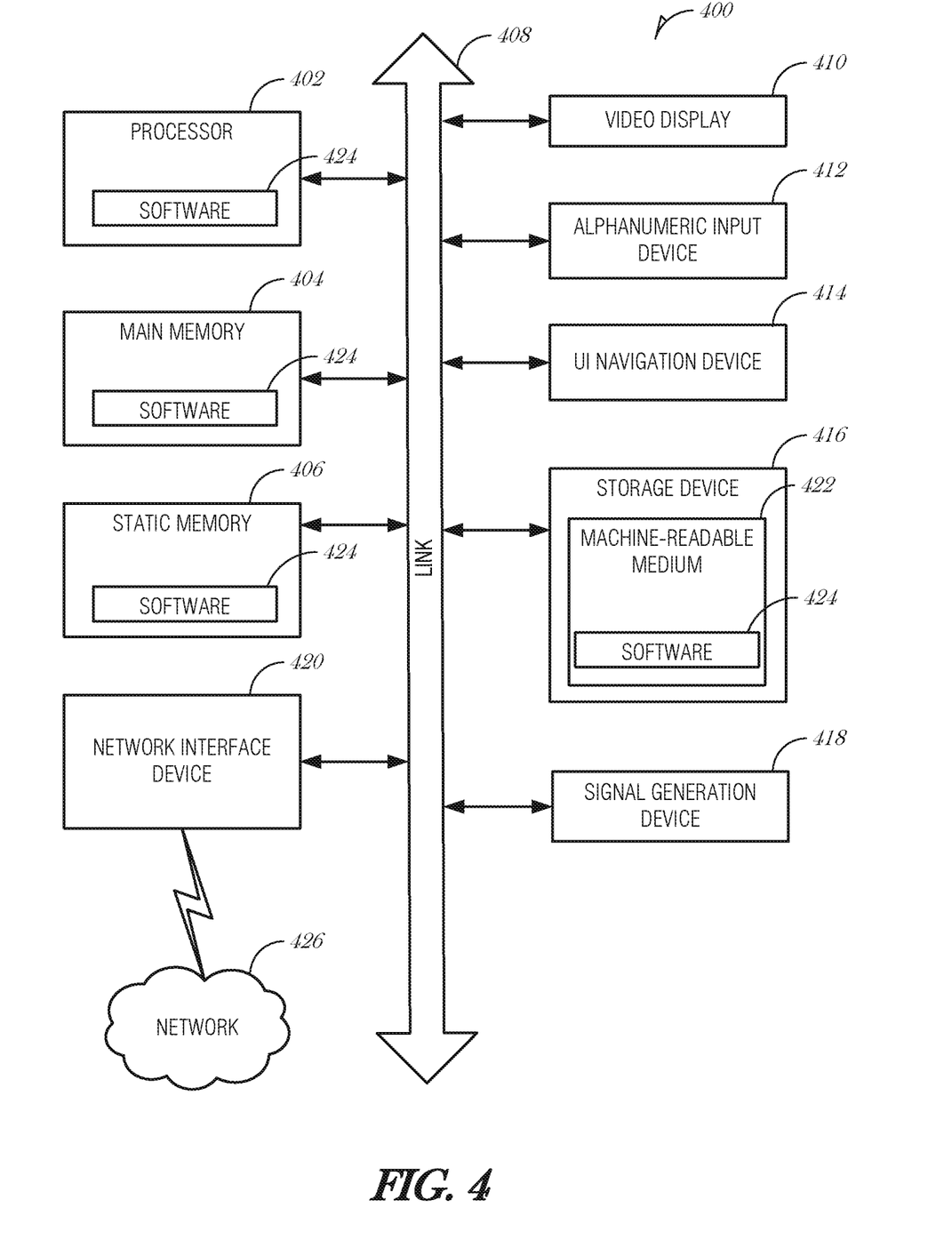
FIG. 4 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 4 is a block diagram illustrating a machine in the example form of a computer system 400, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an infotainment system, a driver's assistance system, a safety system, an engine control system, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, gyrometer, magnetometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is an integrated circuit for monitoring components of the integrated circuit, the integrated circuit comprising: a resource monitoring circuit configured to: track activity factors for a plurality of components of the integrated circuit; evaluate the activity factors for each of the plurality of components; determine whether an activity factor for a particular component of the plurality of components exceeds a threshold; and transmit, from the resource monitoring circuit, a signal to a software element, causing the software element to deactivate the particular component and activate an alternate component, when the activity factor for the particular component exceeds the threshold and the alternate component is available to substitute for the particular component.

In Example 2, the subject matter of Example 1 includes, wherein the activity factor is a ratio of active versus inactive time over a measurement period.

In Example 3, the subject matter of Examples 1-2 includes, wherein the activity factor is an aggregate amount of use.

In Example 4, the subject matter of Examples 1-3 includes, wherein the threshold is specific for the particular component.

In Example 5, the subject matter of Examples 1-4 includes, wherein the particular component comprises an input/output controller.

In Example 6, the subject matter of Examples 1-5 includes, wherein the particular component comprises a memory controller.

In Example 7, the subject matter of Example 6 includes, wherein to deactivate the particular component and activate the alternative component, the software element is configured to cause the memory controller to swizzle memory accesses to a memory device.

In Example 8, the subject matter of Examples 1-7 includes, wherein the particular component comprises a flexible adapter.

In Example 9, the subject matter of Example 8 includes, wherein to deactivate the particular component and activate the alternative component, the software element is configured to cause the flexible adapter to change to a non-active controller.

In Example 10, the subject matter of Examples 1-9 includes, wherein the particular component comprises an analog crossbar switch to randomize IOs.

In Example 11, the subject matter of Example 10 includes, wherein to deactivate the particular component and activate the alternative component, the software element is configured to cause the analog crossbar switch to randomize physical interface driver usage.

In Example 12, the subject matter of Examples 1-11 includes, wherein the particular component comprises a processor core.

In Example 13, the subject matter of Example 12 includes, wherein to deactivate the particular component and activate the alternative component, the software element is configured to deactivate the processor core and activate an idle processor core.

In Example 14, the subject matter of Examples 1-13 includes, wherein the software element comprises firmware.

In Example 15, the subject matter of Examples 1-14 includes, wherein the software element comprises a device driver.

In Example 16, the subject matter of Examples 1-15 includes, wherein the resource monitoring circuit is further configured to determine when the alternate component is available to substitute for the particular component.

Example 17 is a method for monitoring components of an integrated circuit, the method comprising: tracking, by a resource monitoring circuit, activity factors for a plurality of components of the integrated circuit; evaluating the activity factors for each of the plurality of components; determining whether an activity factor for a particular component of the plurality of components exceeds a threshold; and transmitting, from the resource monitoring circuit, a signal to a software element, causing the software element to deactivate the particular component and activate an alternate component, when the activity factor for the particular component exceeds the threshold and the alternate component is available to substitute for the particular component.

In Example 18, the subject matter of Example 17 includes, wherein the activity factor is a ratio of active versus inactive time over a measurement period.

In Example 19, the subject matter of Examples 17-18 includes, wherein the activity factor is an aggregate amount of use.

In Example 20, the subject matter of Examples 17-19 includes, wherein the threshold is specific for the particular component.

In Example 21, the subject matter of Examples 17-20 includes, wherein the particular component comprises an input/output controller.

In Example 22, the subject matter of Examples 17-21 includes, wherein the particular component comprises a memory controller.

In Example 23, the subject matter of Example 22 includes, wherein to deactivate the particular component and activate the alternative component, the software element is configured to cause the memory controller to swizzle memory accesses to a memory device.

In Example 24, the subject matter of Examples 17-23 includes, wherein the particular component comprises a flexible adapter.

In Example 25, the subject matter of Example 24 includes, wherein to deactivate the particular component and activate the alternative component, the software element is configured to cause the flexible adapter to change to a non-active controller.

In Example 26, the subject matter of Examples 17-25 includes, wherein the particular component comprises an analog crossbar switch to randomize IOs.

In Example 27, the subject matter of Example 26 includes, wherein to deactivate the particular component and activate the alternative component, the software element is configured to cause the analog crossbar switch to randomize physical interface driver usage.

In Example 28, the subject matter of Examples 17-27 includes, wherein the particular component comprises a processor core.

In Example 29, the subject matter of Example 28 includes, wherein to deactivate the particular component and activate the alternative component, the software element is configured to deactivate the processor core and activate an idle processor core.

In Example 30, the subject matter of Examples 17-29 includes, wherein the software element comprises firmware.

In Example 31, the subject matter of Examples 17-30 includes, wherein the software element comprises a device driver.

In Example 32, the subject matter of Examples 17-31 includes, determining, by the resource monitoring circuit, when the alternate component is available to substitute for the particular component.

Example 33 is at least one machine-readable medium including instructions, which when executed by a machine, cause the machine to perform operations of any of the methods of Examples 17-32.

Example 34 is an apparatus comprising means for performing any of the methods of Examples 17-32.

Example 35 is an apparatus for monitoring components of an integrated circuit, the apparatus comprising: means for tracking, by a resource monitoring circuit, activity factors for a plurality of components of the integrated circuit; means for evaluating the activity factors for each of the plurality of components; means for determining whether an activity factor for a particular component of the plurality of components exceeds a threshold; and means for transmitting, from the resource monitoring circuit, a signal to a software element, causing the software element to deactivate the particular component and activate an alternate component, when the activity factor for the particular component exceeds the threshold and the alternate component is available to substitute for the particular component.

In Example 36, the subject matter of Example 35 includes, wherein the activity factor is a ratio of active versus inactive time over a measurement period.

In Example 37, the subject matter of Examples 35-36 includes, wherein the activity factor is an aggregate amount of use.

In Example 38, the subject matter of Examples 35-37 includes, wherein the threshold is specific for the particular component.

In Example 39, the subject matter of Examples 35-38 includes, wherein the particular component comprises an input/output controller.

In Example 40, the subject matter of Examples 35-39 includes, wherein the particular component comprises a memory controller.

In Example 41, the subject matter of Example 40 includes, wherein to deactivate the particular component and activate the alternative component, the software element is configured to cause the memory controller to swizzle memory accesses to a memory device.

In Example 42, the subject matter of Examples 35-41 includes, wherein the particular component comprises a flexible adapter.

In Example 43, the subject matter of Example 42 includes, wherein to deactivate the particular component and activate the alternative component, the software element is configured to cause the flexible adapter to change to a non-active controller.

In Example 44, the subject matter of Examples 35-43 includes, wherein the particular component comprises an analog crossbar switch to randomize IOs.

In Example 45, the subject matter of Example 44 includes, wherein to deactivate the particular component and activate the alternative component, the software element is configured to cause the analog crossbar switch to randomize physical interface driver usage.

In Example 46, the subject matter of Examples 35-45 includes, wherein the particular component comprises a processor core.

In Example 47, the subject matter of Example 46 includes, wherein to deactivate the particular component and activate the alternative component, the software element is configured to deactivate the processor core and activate an idle processor core.

In Example 48, the subject matter of Examples 35-47 includes, wherein the software element comprises firmware.

In Example 49, the subject matter of Examples 35-48 includes, wherein the software element comprises a device driver.

In Example 50, the subject matter of Examples 35-49 includes, means for determining, by the resource monitoring circuit, when the alternate component is available to substitute for the particular component.

Example 51 is at least one machine-readable medium including instructions for monitoring components of an integrated circuit, the instructions when executed by a machine, cause the machine to perform the operations comprising: tracking, by a resource monitoring circuit, activity factors for a plurality of components of the integrated circuit; evaluating the activity factors for each of the plurality of components; determining whether an activity factor for a particular component of the plurality of components exceeds a threshold; and transmitting, from the resource monitoring circuit, a signal to a software element, causing the software element to deactivate the particular component and activate an alternate component, when the activity factor for the particular component exceeds the threshold and the alternate component is available to substitute for the particular component.

In Example 52, the subject matter of Example 51 includes, wherein the activity factor is a ratio of active versus inactive time over a measurement period.

In Example 53, the subject matter of Examples 51-52 includes, wherein the activity factor is an aggregate amount of use.

In Example 54, the subject matter of Examples 51-53 includes, wherein the threshold is specific for the particular component.

In Example 55, the subject matter of Examples 51-54 includes, wherein the particular component comprises an input/output controller.

In Example 56, the subject matter of Examples 51-55 includes, wherein the particular component comprises a memory controller.

In Example 57, the subject matter of Example 56 includes, wherein to deactivate the particular component and activate the alternative component, the software element is configured to cause the memory controller to swizzle memory accesses to a memory device.

In Example 58, the subject matter of Examples 51-57 includes, wherein the particular component comprises a flexible adapter.

In Example 59, the subject matter of Example 58 includes, wherein to deactivate the particular component and activate the alternative component, the software element is configured to cause the flexible adapter to change to a non-active controller.

In Example 60, the subject matter of Examples 51-59 includes, wherein the particular component comprises an analog crossbar switch to randomize IOs.

In Example 61, the subject matter of Example 60 includes, wherein to deactivate the particular component and activate the alternative component, the software element is configured to cause the analog crossbar switch to randomize physical interface driver usage.

In Example 62, the subject matter of Examples 51-61 includes, wherein the particular component comprises a processor core.

In Example 63, the subject matter of Example 62 includes, wherein to deactivate the particular component and activate the alternative component, the software element is configured to deactivate the processor core and activate an idle processor core.

In Example 64, the subject matter of Examples 51-63 includes, wherein the software element comprises firmware.

In Example 65, the subject matter of Examples 51-64 includes, wherein the software element comprises a device driver.

In Example 66, the subject matter of Examples 51-65 includes, instructions for determining, by the resource monitoring circuit, when the alternate component is available to substitute for the particular component.

Example 67 is at least one machine-readable medium including instructions that, when executed by processing circuitry, cause the processing circuitry to perform operations to implement of any of Examples 1-66.

Example 68 is an apparatus comprising means to implement of any of Examples 1-66.

Example 69 is a system to implement of any of Examples 1-66.

Example 70 is a method to implement of any of Examples 1-66.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An integrated circuit for monitoring components of the integrated circuit, the integrated circuit comprising:
   a resource monitoring circuit configured to:
   track activity factors for a plurality of components of the integrated circuit, wherein the plurality of components each include at least one processor core;
   evaluate the activity factors for each component of the plurality of components, wherein the activity factors for each component of the plurality of components is an amount of active time of each component of the plurality of components, and wherein the amount of active time of each component is the total amount of time that a particular component of the plurality of components is active;
   determine whether an activity factor for the particular component of the plurality of components exceeds a threshold value, wherein the threshold value is based on an analysis of a previous activity factor value, and is adjusted based on the analysis of the previous activity factor value, and wherein when at least two components of the plurality of components are in use at the same time, increase the threshold value;
   transmit, from the resource monitoring circuit, a signal to a software element, causing the software element to deactivate the particular component and activate an alternate component, when the activity factor for the particular component exceeds the threshold value and the alternate component is available to substitute for the particular component, wherein when the alternate component is not available to substitute for the particular component, increase the threshold value; and
   rotate a processing task among the plurality of components using two or more of the at least one processor core of the plurality of components.

2. The integrated circuit of claim 1, wherein the activity factor is a ratio of active versus inactive time over a measurement period.

3. The integrated circuit of claim 1, wherein the activity factor is an aggregate amount of use.

4. The integrated circuit of claim 1, wherein the threshold value is specific for the particular component.

5. The integrated circuit of claim 1, wherein the particular component comprises an input/output controller.

6. The integrated circuit of claim 1, wherein the particular component comprises a memory controller.

7. The integrated circuit of claim 6, wherein to deactivate the particular component and activate the alternative component, the software element is configured to cause the memory controller to swizzle memory accesses to a memory device.

8. The integrated circuit of claim 1, wherein the particular component comprises a flexible adapter.

9. The integrated circuit of claim 8, wherein to deactivate the particular component and activate the alternative component, the software element is configured to cause the flexible adapter to change to a non-active controller.

10. The integrated circuit of claim 1, wherein the particular component comprises an analog crossbar switch to randomize IOs.

11. The integrated circuit of claim 10, wherein to deactivate the particular component and activate the alternative component, the software element is configured to cause the analog crossbar switch to randomize physical interface driver usage.

12. The integrated circuit of claim 1, wherein the particular component comprises an active processor core.

13. The integrated circuit of claim 12, wherein to deactivate the particular component and activate the alternative component, the software element is configured to deactivate the processor core and activate an idle processor core.

14. The integrated circuit of claim 1, wherein the software element comprises firmware.

15. The integrated circuit of claim 1, wherein the software element comprises a device driver.

16. The integrated circuit of claim 1, wherein the resource monitoring circuit is further configured to determine when the alternate component is available to substitute for the particular component.

17. A method for monitoring components of an integrated circuit, the method comprising:
   tracking, by a resource monitoring circuit, activity factors for a plurality of components of the integrated circuit, wherein the plurality of components each include at least one processor core;
   evaluating the activity factors for each component of the plurality of components, wherein the activity factors for each component of the plurality of components is an amount of active time of each component of the plurality of components, and wherein the amount of active time of each component is the total amount of time that a particular component of the plurality of components is active;
   determining whether an activity factor for the particular component of the plurality of components exceeds a threshold value, wherein the threshold value is based on an analysis of a previous activity factor value, and is adjusted based on the analysis of the previous activity factor value, and wherein when at least two components of the plurality of components are in use at the same time, increase the threshold value;
   transmitting, from the resource monitoring circuit, a signal to a software element, causing the software element to deactivate the particular component and activate an alternate component, when the activity factor for the particular component exceeds the threshold value and the alternate component is available to substitute for the particular component, wherein when the alternate component is not available to substitute for the particular component, increase the threshold value; and
   rotate a processing task among the plurality of components using two or more of the at least one processor core of the plurality of components.

18. The method of claim 17, wherein the activity factor is a ratio of active versus inactive time over a measurement period.

19. The method of claim 17, wherein the particular component comprises a flexible adapter.

20. The method of claim 19, wherein to deactivate the particular component and activate the alternative component, the software element is configured to cause the flexible adapter to change to a non-active controller.

21. The method of claim 17, wherein the particular component comprises an analog crossbar switch to randomize IOs.

22. The method of claim 21, wherein to deactivate the particular component and activate the alternative component, the software element is configured to cause the analog crossbar switch to randomize physical interface driver usage.

23. At least one non-transitory machine-readable medium including instructions for monitoring components of an integrated circuit, the instructions when executed by a machine, cause the machine to perform the operations comprising:
   tracking, by a resource monitoring circuit, activity factors for a plurality of components of the integrated circuit, wherein the plurality of components each include at least one processor core;
   evaluating the activity factors for each component of the plurality of components, wherein the activity factors for each component of the plurality of components are evaluated based on an amount of active time of each component of the plurality of components, and wherein the amount of active time of each component is the total amount of time that a particular component of the plurality of components is active;
   determining whether an activity factor for the particular component of the plurality of components exceeds a threshold value, wherein the threshold value is based on an analysis of a previous activity factor value, and is adjusted based on the analysis of the previous activity factor value, and wherein when at least two components of the plurality of components are in use at the same time, increase the threshold value;
   transmitting, from the resource monitoring circuit, a signal to a software element, causing the software element to deactivate the particular component and activate an alternate component, when the activity factor for the particular component exceeds the threshold value and the alternate component is available to substitute for the particular component, wherein when the alternate component is not available to substitute for the particular component, increase the threshold value; and
   rotating a processing task among the plurality of components using two or more of the at least one processor core of the plurality of components.

24. The at least one non-transitory machine-readable medium of claim 23, wherein the software element comprises firmware.

25. The at least one non-transitory machine-readable medium of claim 23, further including instructions for determining, by the resource monitoring circuit, when the alternate component is available to substitute for the particular component.

\* \* \* \* \*